(12) United States Patent
Hisanaga et al.

(10) Patent No.: US 9,879,919 B2
(45) Date of Patent: Jan. 30, 2018

(54) HEAT EXCHANGER AND METHOD OF MANUFACTURING SAME

(71) Applicant: YUTAKA GIKEN CO., LTD., Hamamatsu-shi, Shizuoka (JP)

(72) Inventors: Toru Hisanaga, Hamamatsu (JP); Hiroshi Nagura, Hamamatsu (JP); Koji Takeda, Hamamatsu (JP); Kozue Suzuki, Hamamatsu (JP)

(73) Assignee: YUTAKA GIKEN CO., LTD. (JP)

( * ) Notice: Subject to any disclaimer, the term of this patent is extended or adjusted under 35 U.S.C. 154(b) by 234 days.

(21) Appl. No.: 14/729,166

(22) Filed: Jun. 3, 2015

(65) Prior Publication Data
US 2015/0369543 A1   Dec. 24, 2015

(30) Foreign Application Priority Data

Jun. 18, 2014 (JP) .................................. 2014-125387
Jun. 18, 2014 (JP) .................................. 2014-125407

(51) Int. Cl.
*F28F 9/02* (2006.01)
*F28D 7/16* (2006.01)
(Continued)

(52) U.S. Cl.
CPC .......... *F28D 7/1684* (2013.01); *B23K 26/262* (2015.10); *F28D 21/0003* (2013.01);
(Continued)

(58) Field of Classification Search
CPC ............... F28D 7/1684; F28D 21/0003; F28F 2275/06; B23K 26/262; B23K 2201/14; Y10T 29/49352; B23P 15/26
(Continued)

(56) References Cited

U.S. PATENT DOCUMENTS 2,539,870 A * 1/1951 Simpelaar ............. F28D 9/0037
                                                          165/157
2,617,634 A * 11/1952 Jendrassik ............ F28D 9/0043
                                                          165/140
(Continued)

FOREIGN PATENT DOCUMENTS

JP          10009791       1/1998
JP         2003028586      1/2003
(Continued)

OTHER PUBLICATIONS

Notification of Reasons for Refusal issued on Dec. 12, 2016 in Japanese Patent Application No. 2014-125407 together with English-language translation thereof.

(Continued)

*Primary Examiner* — Justin Jonaitis
(74) *Attorney, Agent, or Firm* — Klintworth & Rozenblat IP LLP; Bruce L. Adams, Esq.

(57) ABSTRACT

A heat exchanger includes a pair of end plates closing opposite ends of a cylindrical core case, and a plurality of heat exchange tubes each supported at opposite end portions by the end plates. The end plates have support holes, and opposite ends of the tubes are inserted into corresponding support holes in the end plates. Each of the tubes is formed by bending a plate material so that opposite side edge portions of the bent plate material are superimposed on each other, one of the superimposed side edge portions, located inward of the other of the superimposed side edge portions, forming an inner plate portion, the other of the superimposed side edge portions forming an outer plate portion, and then welding a weld bead through the thickness of one of the inner and outer plate portions to fuse to the other plate portion.

3 Claims, 15 Drawing Sheets

(51) Int. Cl.
*B23K 26/262* (2014.01)
*F28D 21/00* (2006.01)
B23P 15/26 (2006.01)
B23K 101/14 (2006.01)

(52) U.S. Cl.
CPC ........... *B23K 2201/14* (2013.01); *B23P 15/26* (2013.01); *F28F 2275/06* (2013.01); *Y10T 29/49352* (2015.01)

(58) Field of Classification Search
USPC .................... 165/158, 157, 159, 160
See application file for complete search history.

(56) References Cited

U.S. PATENT DOCUMENTS

| | | | | |
|---|---|---|---|---|
| 2,877,000 A | * | 3/1959 | Person | F28D 1/0316 165/130 |
| 3,439,739 A | * | 4/1969 | Jaeger | F28D 7/106 165/164 |
| 5,004,042 A | * | 4/1991 | McMorries, IV | F01P 3/207 123/41.01 |
| 5,544,699 A | * | 8/1996 | Robers | F01M 1/20 165/103 |
| 2004/0074882 A1 | | 4/2004 | Speranza et al. | 219/121.64 |
| 2011/0240270 A1 | * | 10/2011 | Hisanaga | F28D 7/1684 165/151 |
| 2014/0008328 A1 | | 1/2014 | Enyedy | 219/58 |

FOREIGN PATENT DOCUMENTS

| | | | | |
|---|---|---|---|---|
| JP | 2006118830 | | 5/2006 | |
| JP | 2007212084 | | 8/2007 | |
| JP | 2007212084 A | * | 8/2007 | ........... F28D 1/0316 |
| JP | 2008260049 | | 10/2008 | |

OTHER PUBLICATIONS

Notification of Reasons for Refusal issued Nov. 11, 2016 in Japanese Patent Application No. 2014-125387.

* cited by examiner

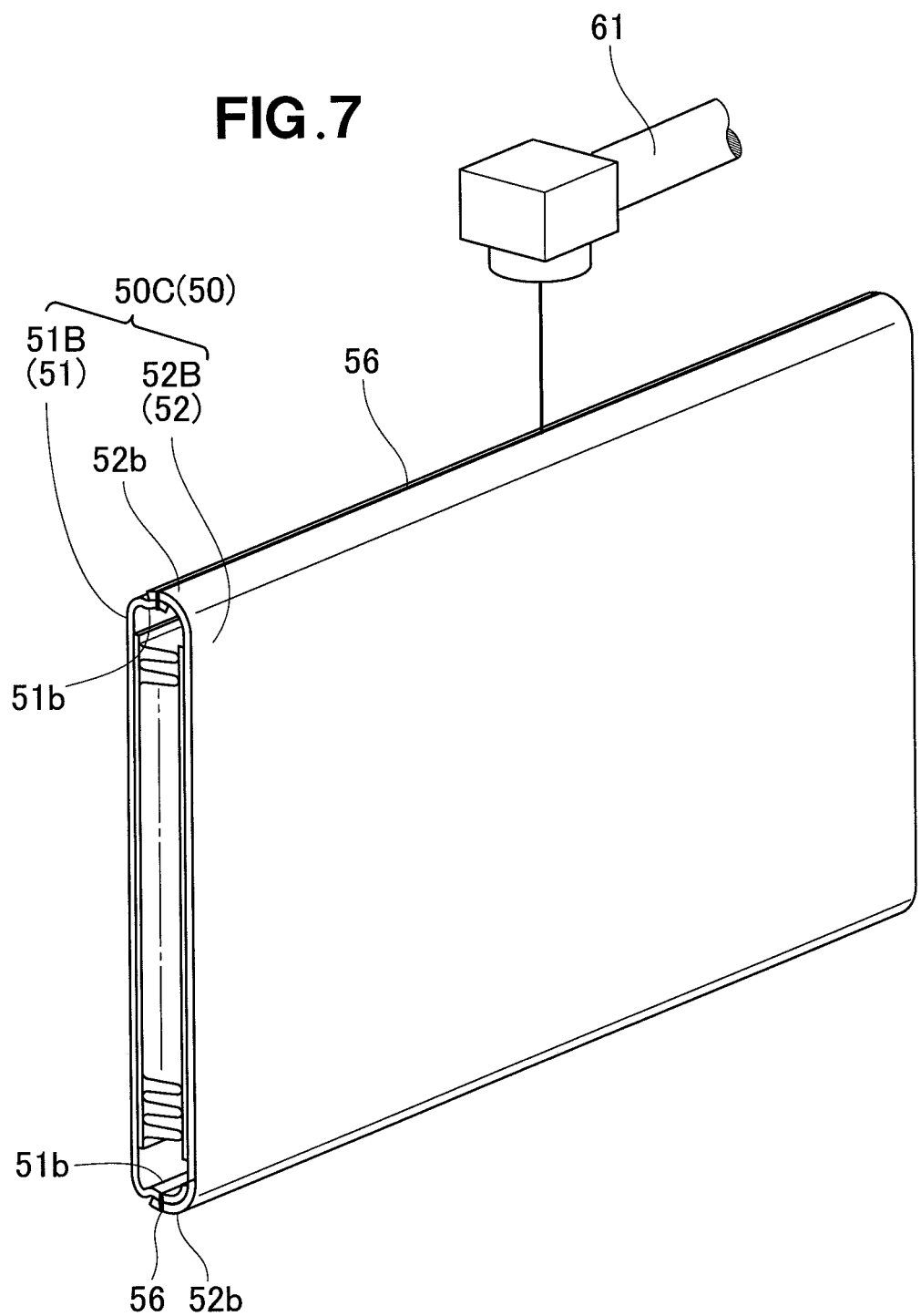

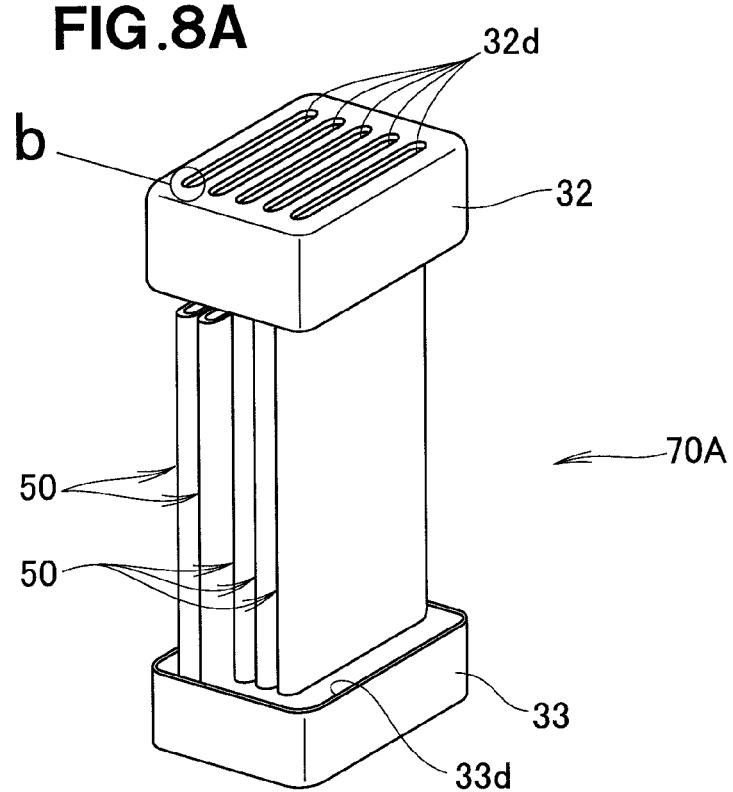
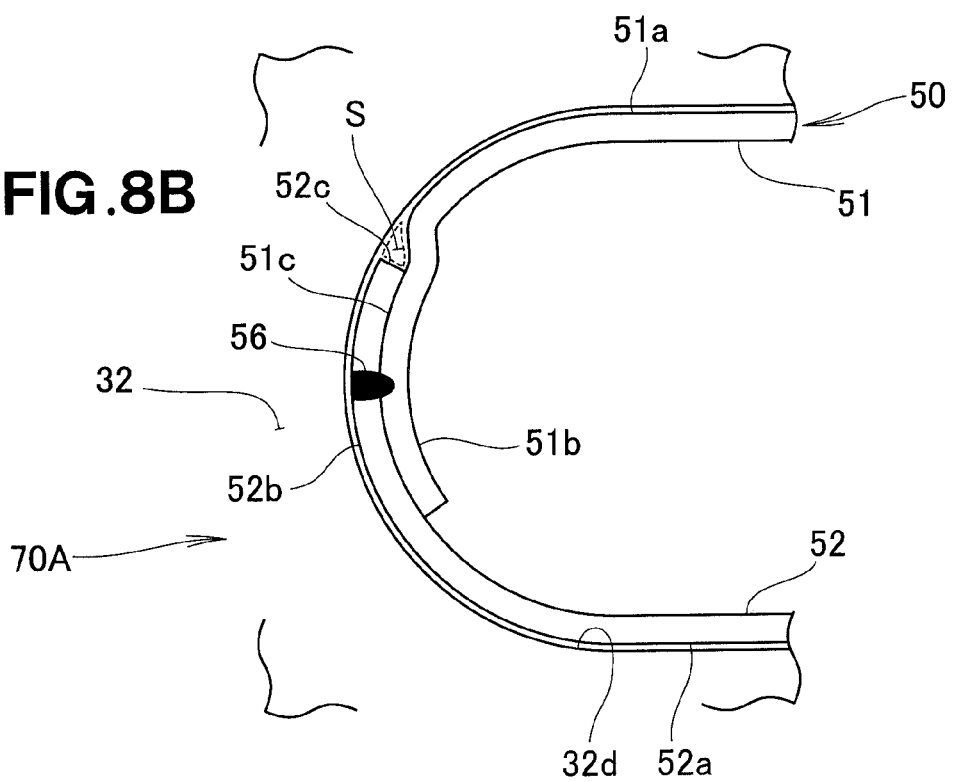

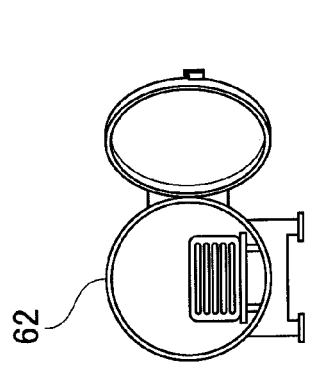
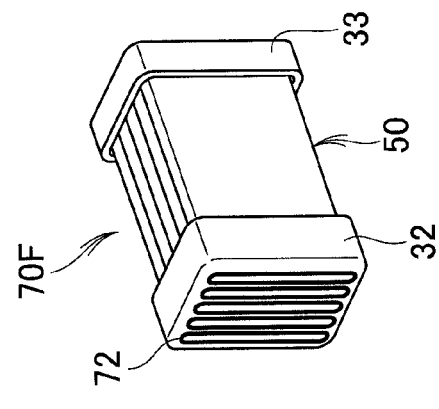
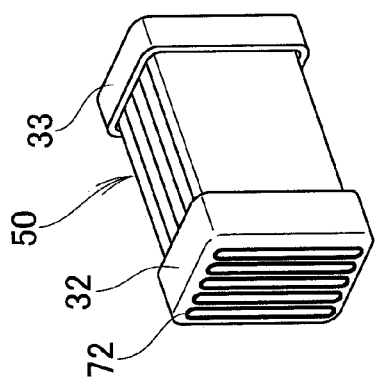
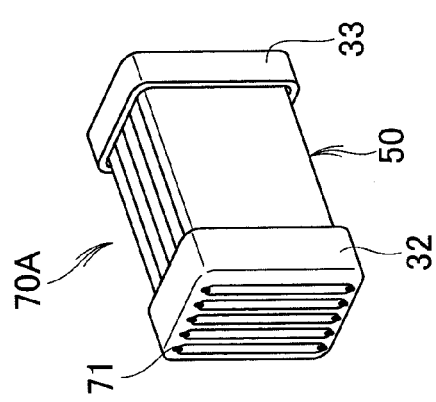
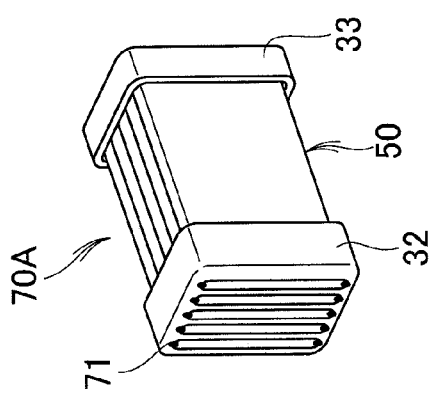
FIG.13A
FIG.13B

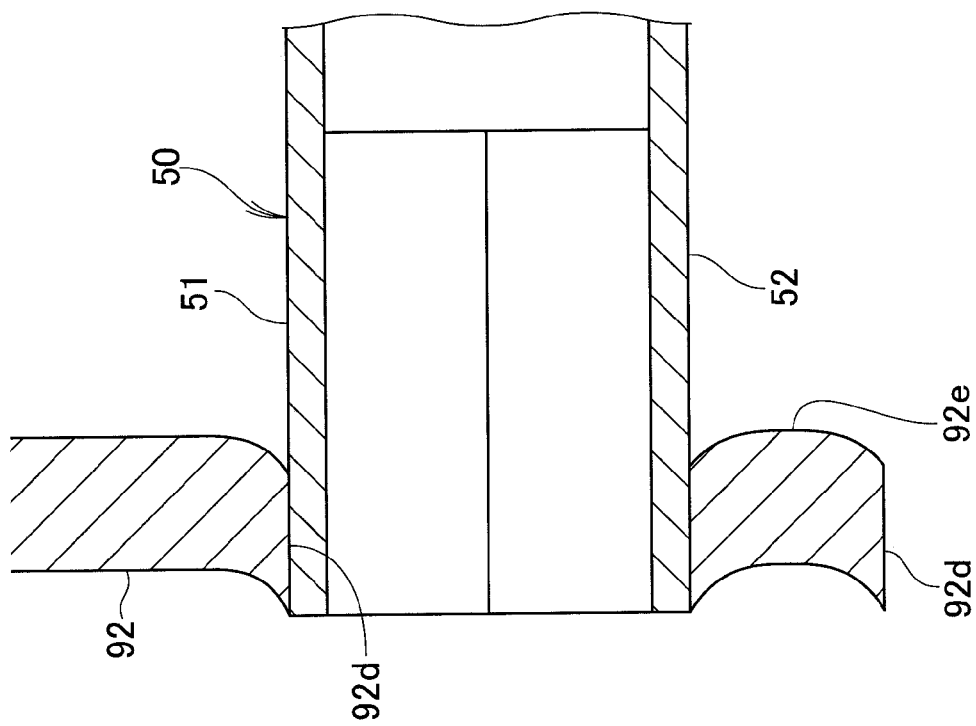
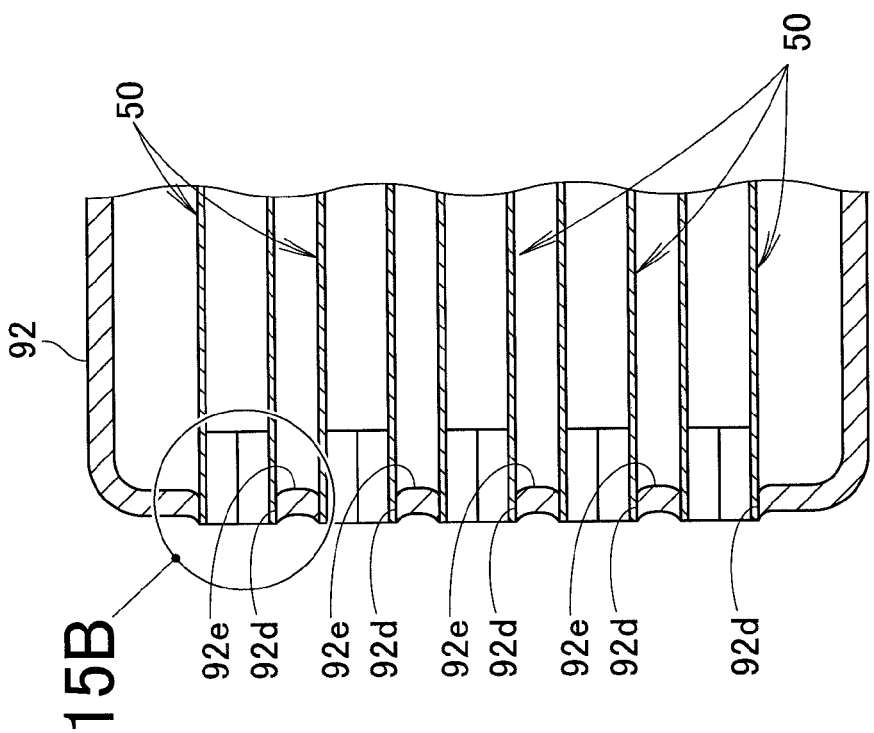

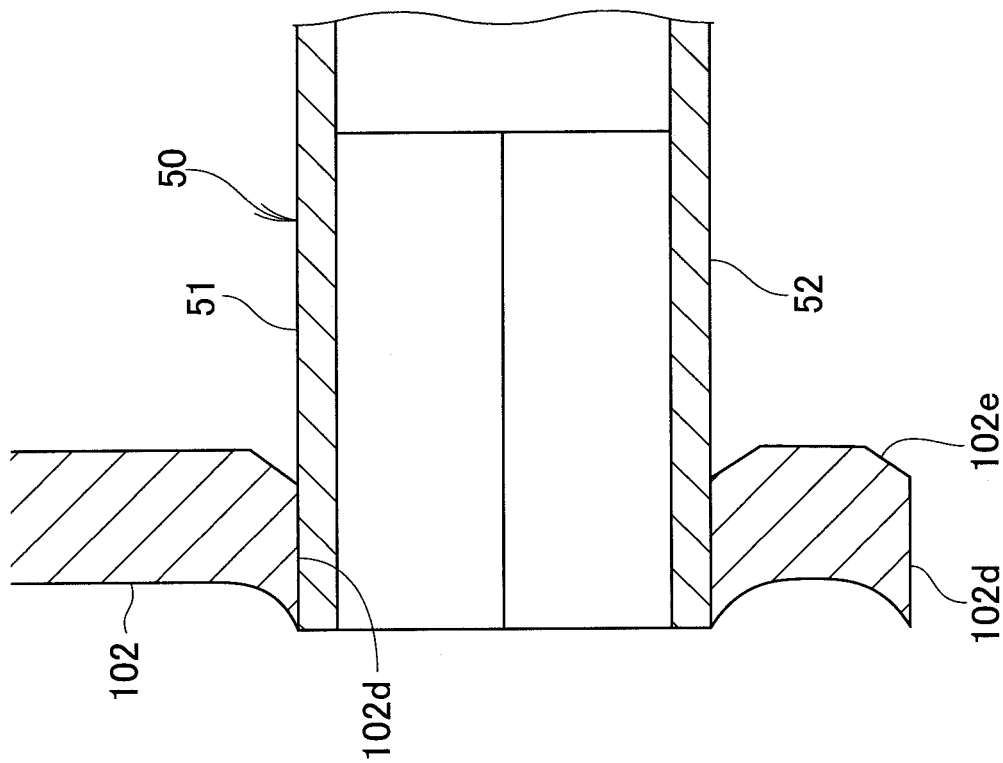
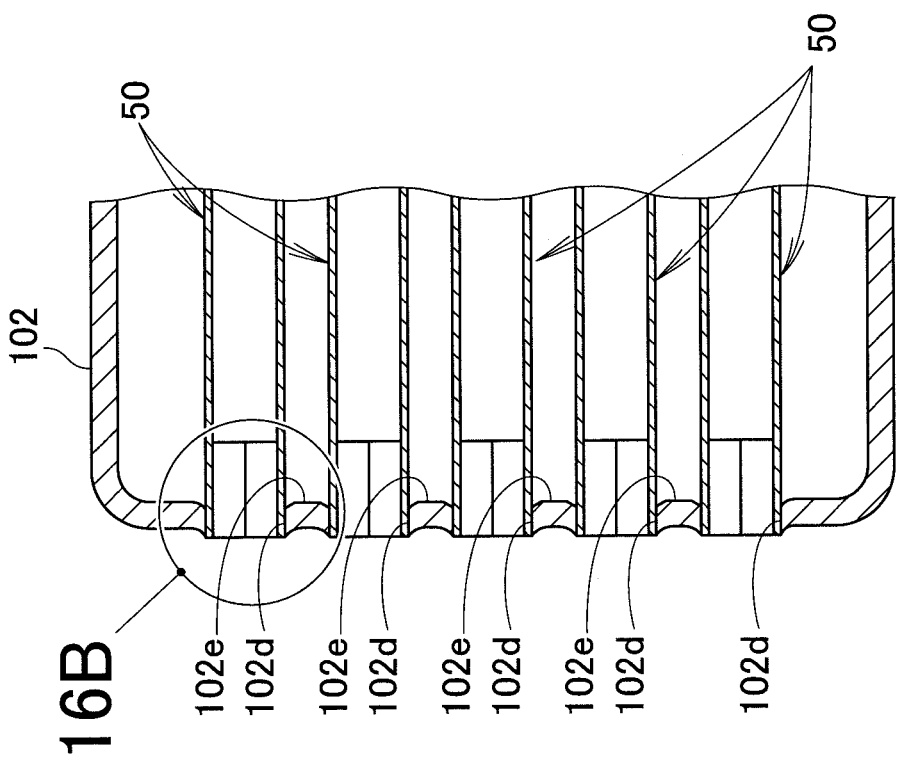

HEAT EXCHANGER AND METHOD OF MANUFACTURING SAME

FIELD OF THE INVENTION

The present invention relates to an improved heat exchanger, and a method for manufacturing the heat exchanger.

BACKGROUND OF THE INVENTION

Heat exchangers having built-in heat exchange tubes are used in order to recover heat of exhaust gas produced during travel of a vehicle. More specifically, exhaust gas is caused to flow along the inner periphery of the heat exchange tubes while a medium is caused to flow along the outer periphery of the heat exchange tube, so that heat of the exhaust gas is recovered.

A heat exchange tube for a heat exchanger disclosed in Japanese Patent Application Laid-open Publication No. 2003-28586 is shown in FIG. 17A. In FIG. 17A, the heat exchange tube 110 used in the heat exchanger includes: a first case half 111 having a generally U shape as viewed in front elevation; a second case half 112 having a generally U shape as viewed in front elevation and having side edge portions superimposed on side edge portions of the first case half 111; and a fin accommodated in a tube defined by the first and second case halves 111 and 112. A distal end portion 110a of each of the side edge portions of the first case half 111 is bent slightly inward to extend along the inner periphery of the second case half 112.

As shown in FIG. 17B that is a fragmentary enlarged view of a section encircled at 17B in FIG. 17B. It is customary to weld together the first and second case halves 111 and 112 in order to prevent leakage of fluid from the tube. At the time of welding, a weld bead 116 is formed such that the first and second case halves 111 and 112 are welded together via the bead 116.

However, if the bead 116 protrudes beyond the outer surface of the first case half 111, then mountability of the heat exchange tube would be degraded. It may be conceivable to shave off the protruding portion of the bead 116a, in which case, however, the number of steps necessary for manufacturing the heat exchange tube 110 would increase and hence the number of steps necessary for manufacturing the heat exchanger would also increase.

SUMMARY OF THE INVENTION

In view of the foregoing prior art problems, it is an object of the present invention to provide an improved heat exchanger which can be manufactured with a reduced number of steps, and a method for manufacturing the heat exchanger.

In order to accomplish the above-mentioned object, according to one aspect of the present invention provides an improved heat exchanger, which comprises: a cylindrical core case; a pair of end plates closing opposite ends of the core case; and a plurality of heat exchange tubes each supported at opposite end portions thereof by the end plates, a first heat medium being caused to flow through an interior of the heat exchange tubes, so that heat exchange is performed between the first heat medium and a second heat medium caused to flow along the outer periphery of the heat exchange tubes, each of the heat exchange tubes being formed by: bending a plate material greater in length than a perimeter of the heat exchange tube in such a manner that opposite edge portions of the bent plate material are superimposed on each other in at least one section of the plate material, one of the superimposed edge portions of the plate material, located inward of the other of the superimposed edge portions of the plate material, forming an inner plate portion, the other of the superimposed edge portions of the plate material forming an outer plate portion; and then causing a first weld bead, disposed through a thickness of one of the inner and outer plate portions, to be fused to the other of the inner and outer plate portions.

Namely, according to the present invention, the superimposed inner and outer plate portions in each of the heat exchange tubes are joined together with the first weld bead, disposed through the plate thickness of one of the inner and outer plate portions, fused to the other of the inner and outer plate portions. Namely, the first weld bead is formed on the section where the inner plate portion and the second plate portion are superimposed on each other. Thus, it is possible to prevent the first weld bead from protruding beyond the outer surface of the outer plate portion. As a result, it is possible to eliminate a need for shaving off the first weld bead so as not to protrude beyond (i.e., so as to lie generally in flush with) the outer surface of the outer plate portion, so that the heat exchange tube can be manufactured with a reduced number of steps. Therefore, the present invention can advantageously reduce the total number of necessary steps for manufacturing the entire heat exchanger.

Preferably, each of the heat exchange tubes is temporarily tacked at each of the opposite end portions to a corresponding one of the end plates by a second weld bead. Thus, the heat exchange tubes can be reliably fixed to the two end plates.

Preferably, the second weld bead fills a gap of a generally triangular shape defined, at each of the opposite end portions of the heat exchange tubes, by the outer surface of the inner plate portion, the end surface of the outer plate portion and the corresponding one of the end plates. The gap formed inevitably due to the plate thickness of the outer plate portion can be filled with the second weld bead simultaneously as the heat exchange tube is welded to be fixed to the end plate. Thus, there is no need for a separate operation for filling the gap, so that the heat exchanger can be advantageously manufactured with a reduced number of steps.

Preferably, each of the heat exchange tubes has a generally elliptical cross-sectional shape over an upstream-to-downstream length thereof along a flowing direction of the first heat medium. Thus, each of the heat exchange tube has an elliptical shape as viewed in end elevation. If the heat exchange tube has a rectangular shape as viewed in end elevation, i.e. rectangular cross-sectional shape, the first heat medium is caused to flow to the opposite edge portions of the tube where the fin is not disposed. However, if the heat exchange tube has a generally elliptical shape as viewed in end elevation, i.e., elliptical cross-sectional shape, as in the present invention, it is possible to make it difficult for the first heat medium to flow to the opposite edge portions of the heat exchange tube, thereby enhancing the heat exchange efficiency. Further, the heat exchange tube having a generally elliptical shape as above can not only facilitate welding, but also prevent stress concentration and enhance mountability of the heat exchange tube to the end plates.

Preferably, a fin is accommodated in each of the heat exchange tubes, and the fin is brazed to the heat exchange tube by means of a sheet-shaped brazing filler material. Thus, a necessary operating time for positioning the brazing filler material can be reduced as compared to a case where a brazing filler material in paste form is to be positioned.

Thus, it is possible to reduce a necessary time for manufacturing the heat exchange tube and hence the heat exchanger. Moreover, after the joining of the heat exchange tube, a leakage check can be performed to check for any leakage of exhaust gas through the joint section.

Preferably, the second weld bead comprises a plurality of dot-shaped beads, and the inner plate portion, the outer plate portion and the end plate are welded together by means of the second weld bead in the section where the inner plate portion and the outer plate portion are superimposed on each other. Further, a continuous bead is formed on the peripheral edge, at each of the opposite end portions, of the heat exchange tube, and the second weld bead is covered by the continuous bead. Thus, the heat exchange tube is temporarily tacked to the end plate in advance before the peripheral edge of the heat exchange tube is welded to the end plate. At that time, particularly for the section where the two plate portions are superimposed on each other and could easily peel off, at least one of end portions of the wall sections 51b and 51b and a region where the two wall sections 51b and 52b are superimposed on each other is temporarily tacked. In this way, it is possible to prevent the heat exchange tube from peeling off the end plate due to influences of heat during continuous welding, to the end plate, of the peripheral edge of the heat exchange tube. Namely, the peripheral edge, at each of the end portions, of the heat exchange tube can be welded to the end plate with no gap therebetween with an increased reliability.

Preferably, the second weld bead is formed by welding lower in energy than welding performed for forming the continuous bead. If high-energy welding is employed in the step where the second weld bead is formed, slight distortion might occur in the heat exchange tube such that subsequent steps would become difficult to perform. The step where the continuous bead is formed is performed after the step where the second weld bead is formed. Thus, in order to avoid a gap between the end plate and the heat exchange tube with an increased reliability, the continuous bead is formed by welding higher in energy than the welding performed for forming the second weld bead. Therefore, it is possible to reliably prevent occurrence of any unwanted gap while securing good assemblability of the heat exchanger.

Preferably, the end plates each have a plurality of support holes formed therein in corresponding relation to the plurality of heat exchange tubes so that the opposite end portions of each of the heat exchange tubes are inserted in corresponding ones of the support holes in the end plates, and each of the end plates has a projecting portion around the periphery of each of the support holes, the projecting portion being formed to gradually decrease in plate thickness toward the distal end thereof located adjacent to the outer end of one of the end portions of the corresponding heat exchange tube. Because the distal end of the projecting portion defining the support hole has a small thickness, an overall thickness of a joint section between the distal end and the heat exchange tube can be reduced. Thus, it is possible to reduce energy necessary for welding the heat exchange tube to the end plate. Further, because of the reduced overall thickness, the welding can be performed in a stable manner.

According to another aspect of the present invention, there is provided an improved heat exchanger manufacturing method, which comprises: a preparation step of preparing a first case half having a generally U cross-sectional shape as viewed in end elevation and a second case half having a generally U cross-sectional shape to constitute a heat exchange tube together with the first case half; a superimposing step of superimposing respective side edge portions of the first and second case halves in such a manner that one of the superimposed side edge portions, located inward of the other of the superimposed side edge portions, forms an inner plate portion while the other of the superimposed side edge portions forms an outer plate portion, to thereby provide a flat, temporarily-assembled tube; and a welding step of disposing a first weld bead through the thickness of one of the inner and outer plate portions and fusing the first weld bead to the other of the inner and outer plate portions for joining together the first and second case halves, to thereby provide the heat exchange tube.

Namely, according to the heat exchange tube manufacturing method, the first weld bead is disposed through the plate thickness of one of the inner and outer plate portions in a section where the first and second case halves are superimposed, and the first weld bead is fused to the other of the inner and outer plate portions. Namely, the first weld bead is formed on the section where the inner plate portion and the second plate portion are superimposed on each other. Thus, it is possible to prevent the first weld bead from protruding beyond the outer surface of the outer plate portion. As a result, it is possible to eliminate a need for shaving off the first weld bead so as not to protrude beyond (i.e., so as to lie generally in flush with) the outer surface of the outer plate portion, so that the heat exchange tube can be manufactured with a reduced number of steps. Therefore, the present invention can advantageously reduce the total number of necessary steps for manufacturing the entire heat exchanger.

Preferably, the heat exchanger manufacturing method of the present invention further comprises: an inserting step of inserting opposite end portions of the heat exchange tube into the two end plates to thereby provide a tube-inserted unit; and a temporary tacking step of providing a temporarily-assembled end plate/tube unit by temporarily tacking the heat exchange tube to each of the two end plates by means of a second weld bead and filling, with the second weld bead, a gap of a generally triangular shape defined, at each of the opposite end portions of the heat exchange tube, by the outer surface of the inner plate portion, the end surface of the outer plate portion and a corresponding one of the end plates. The gap formed inevitably due to the plate thickness of the outer plate portion can be filled with the second weld bead simultaneously as the heat exchange tube is welded to be fixed to the end plate. Thus, there is no need for a separate operation for filling the gap, so that the heat exchanger can be advantageously manufactured with a reduced number of steps.

Preferably, the heat exchanger manufacturing method of the present invention which further comprises: a brazing-filler-material attaching step of attaching two sheet-shaped brazing filler materials to respective ones of the first and second case halves prior to the superimposing step, wherein when the temporarily-assembled tube is to be provided in the superimposing step, a fin is sandwiched by the two brazing filler materials in closed contact with the brazing filler materials; a brazing step of brazing the fin to the heat exchange tube by means of the brazing filler materials; and a final welding step of continuously welding the peripheral edges, at the opposite end portions, of the heat exchange tube to the end plates. In the final welding, the heat exchange tube might slightly shrink due to heat. Further, if the final welding is performed before the brazing, variation might undesirably occur in the joint strength of the fin due to distortion that might occur in the final welding. To avoid such inconveniences, the brazing is performed prior to the final welding in the present invention, so that the present invention can stabilize the joint strength throughout the entire fin. Further, because the heat exchange tube is welded to the end plates in the present invention, the present invention can join the heat exchange tube to the end plates with an increased strength as compared to the case where the heat exchange tube is merely brazed to the end plates.

Preferably, the heat exchanger tube manufacturing method of the present invention further comprises: an inserting step of inserting opposite end portions of the heat exchange tube into the end plates to thereby provide a tube-inserted unit; and a temporary tacking step of providing a temporarily-assembled end plate/tube unit by temporarily tacking the heat exchange tube to each of the end plates by means of a second weld bead, and welding, by means of the second weld bead, the superimposed inner plate portion and outer plate portion at each of the opposite end portions to a corresponding one of the end plates. The gap formed inevitably due to the plate thickness can be filled with the second weld bead simultaneously as the heat exchange tube is welded to be fixed to the end plate. Thus, there is no need for a separate operation for filling the gap, so that the heat exchanger can be advantageously manufactured with a reduced number of steps.

Preferably, the temporary tacking step is performed by welding lower in energy than welding performed in the final welding step. If high-energy welding is employed in the temporary tacking step, slight distortion might occur in the heat exchange tube so that subsequent steps would become difficult to perform. Because the final welding step is performed after the temporary tacking, the continuous bead is formed by welding higher in energy than the welding performed for forming the first and second weld beads. Therefore, it can be said that the present invention can reliably prevent occurrence of any unwanted gap while securing good assemblability of the heat exchanger.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 7 is a view explanatory of a tube welding step in the method for manufacturing the heat exchanger shown in FIG. 1;

FIGS. 8A and 8B are views explanatory of an inserting step in the method for manufacturing the heat exchanger shown in FIG. 1;

FIGS. 13A and 13B are views comparatively showing the comparative conventional example of the heat exchanger and the first embodiment of the heat exchanger of the present invention;

FIGS. 15A and 15B are sectional views showing principal sections of a third embodiment of the heat exchanger of the present invention;

FIGS. 16A and 16B are sectional views showing principal sections of a fourth embodiment of the heat exchanger of the present invention.

DETAILED DESCRIPTION OF THE INVENTION

Figure 1:
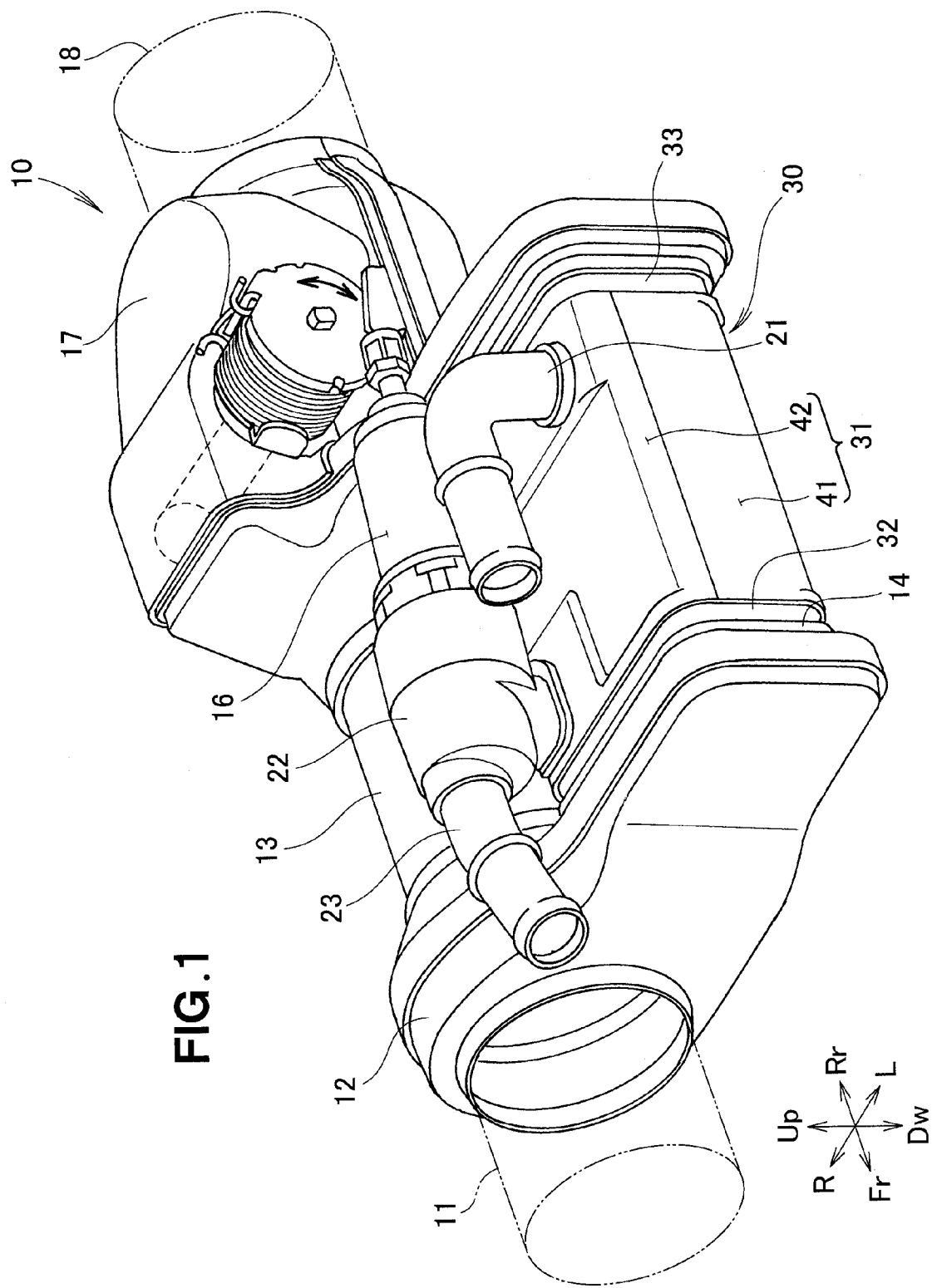
FIG. 1 is a perspective view of an exhaust gas heat recovery apparatus to which is applied a first embodiment of a heat exchanger of the present invention.

FIGS. 1 to 4 show a first embodiment of a heat exchanger 10 of the present invention. As shown in FIG. 1, the heat exchanger 10 includes: an introduction pipe 11 through which is introduced exhaust gas (i.e., first heat medium) produced in an internal combustion engine; a branch section 12 to which is connected the introduction pipe 11; a first flow passage 13 connected to the branch section 12 and extending downstream of the introduction pipe 11; a second flow passage 14 extending from the branch section 12 along the first flow passage 13; a heat exchanger 30 defining a part of the second flow passage 14 and conveying heat of the exhaust gas to a medium (second heat medium); a thermoactuator 16 connected to the heat exchanger 30; a valve chamber 17 to which are connected the respective downstream ends of the first and second flow passages 13 and 14; an exhaust pipe 18 connected to the valve chamber 17 for discharging the exhaust gas; and a valve accommodated in the valve chamber 17 and capable of opening and closing the first flow passage 13. The valve chamber 17 functions also as a confluence section where the exhaust gas having passed through the first or second flow passage 13 or 14 joins together.

Further, a medium introduction pipe 21 (second heat medium introduction pipe 21) for introducing a medium is connected to the heat exchanger 30. Also, an actuator support member 22 supporting the thermoactuator 16 is connected to the heat exchanger 30, and a medium discharge pipe 23 (second heat medium discharge pipe 23) for discharging the medium is connected to the actuator support member 22.

Namely, the medium is introduced through the second heat medium introduction pipe 21 into the heat exchanger 30. The medium thus introduced into the heat exchanger 30 is subjected to heat of the medium in the heat exchanger 30 and then discharged from the heat exchanger 30 through the medium discharge pipe 23. Namely, the heat exchanger 30 recovers heat energy of the exhaust gas. Details of the heat exchanger 30 will be discussed later with reference to FIGS. 2 and 3.

Figure 2:
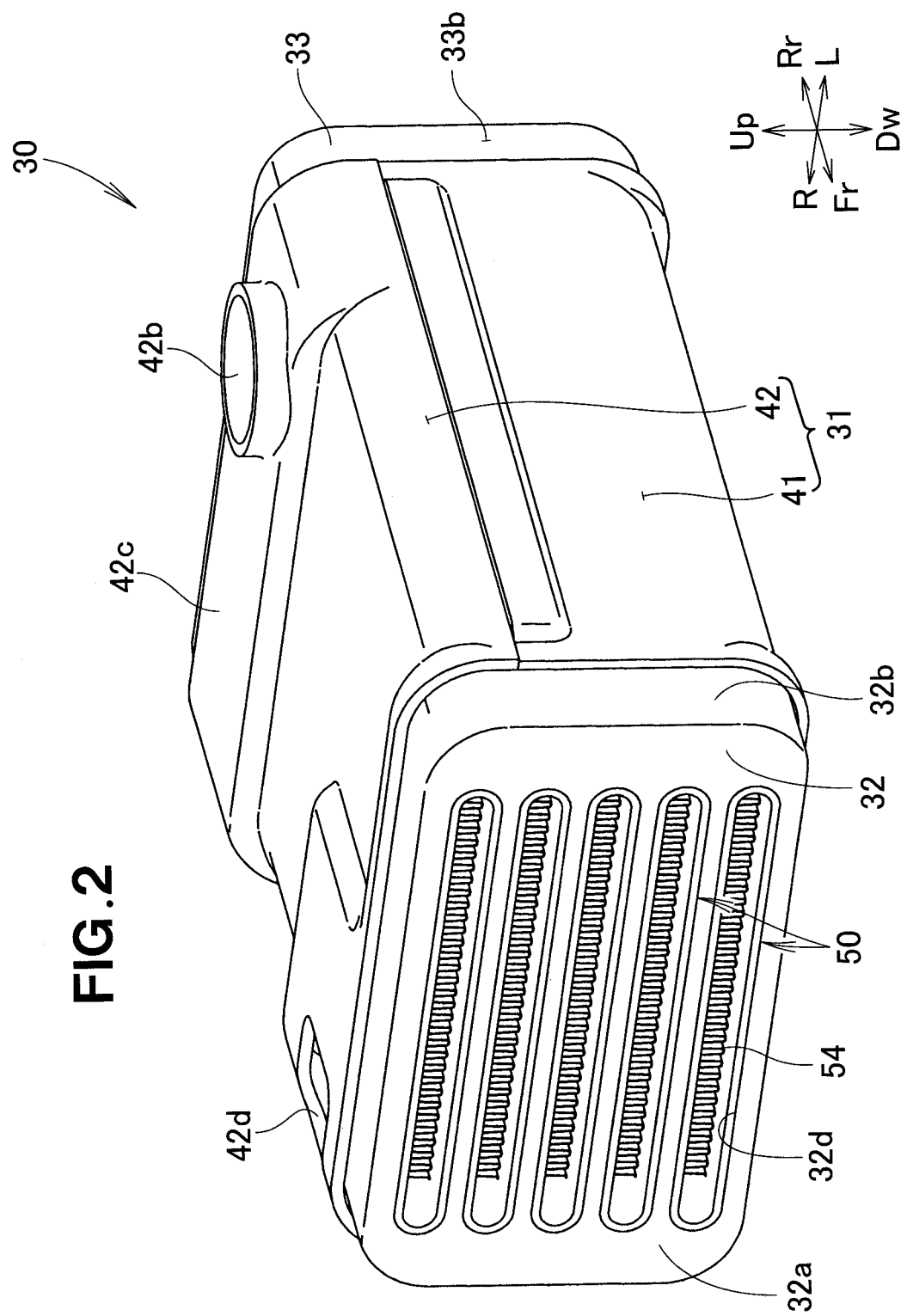
FIG. 2 is a perspective view of the heat exchanger of FIG. 1.

As shown in FIG. 2, the heat exchanger 30 includes: a core case 31 of a generally rectangular cylindrical shape in which the medium is caused to flow; upstream and downstream end plates 32 and 33 mounted so as to close opposite end openings of the core case 31; a plurality of (five in the illustrated example of FIG. 2) heat exchange tubes 50 mounted between the upstream and downstream end plates 32 and 33 and allowing passage through its interior of the exhaust gas; and a fin 54 accommodated in the heat exchange tubes 50.

The five heat exchange tubes 50 are each inserted at opposite end portions thereof in the upstream end plate 32 having a generally rectangular shape as viewed in front elevation and in the downstream end plate 33 also having a generally rectangular shape as viewed in front elevation.

The core case 31 includes a lower case half 41 having a generally U shape as viewed in front elevation and defining a lower half of the core case 31, and an upper case half 42 having a generally inverted U shape as viewed in front elevation, defining an upper half of the core case 31 and joined to the lower case half 41. The lower case half 41 is joined to the upstream and downstream end plates 32 and 33 and the upper case half 42. The upper case half 42 is joined to the upstream and downstream end plates 32 and 33 and the lower case half 41.

A medium introduction port 42b (second heat medium introduction port 42b) for introducing a medium is formed on an upper surface portion 42c of the upper case half 42. The above-mentioned medium introduction pipe 21 (FIG. 1) is connected to the medium introduction port 42b.

Further, a medium discharge port 42d (second heat medium discharge port 42d) for discharging a medium is formed in an upper surface portion 42c of the upper case half 42. The above-mentioned actuator support member 22 (FIG. 1) is connected to the medium discharge port 42d.

The upper case half 42 has a generally rectangular shape as viewed in plan. The medium introduction port 42b and the medium discharge port 42d are formed in the upper surface portion 42c of such an upper case half 42. As viewed in a flowing direction of the first heat medium, the medium introduction port 42b is formed in a downstream end portion of the upper case half 42, while the medium discharge port 42d is formed in an upstream end portion of the upper case half 42. Further, as viewed in a direction perpendicular to the flowing direction of the first heat medium and along the upper surface portion 42c, the medium introduction port 42b is formed in one end portion of the upper case half 42, while the medium discharge port 42d is formed in another end portion of the upper case half 42 generally diagonally opposite the one end portion. Thus, heat exchange between the first heat medium (exhaust gas) and the second heat medium can be performed with a high efficiency.

Figure 3:
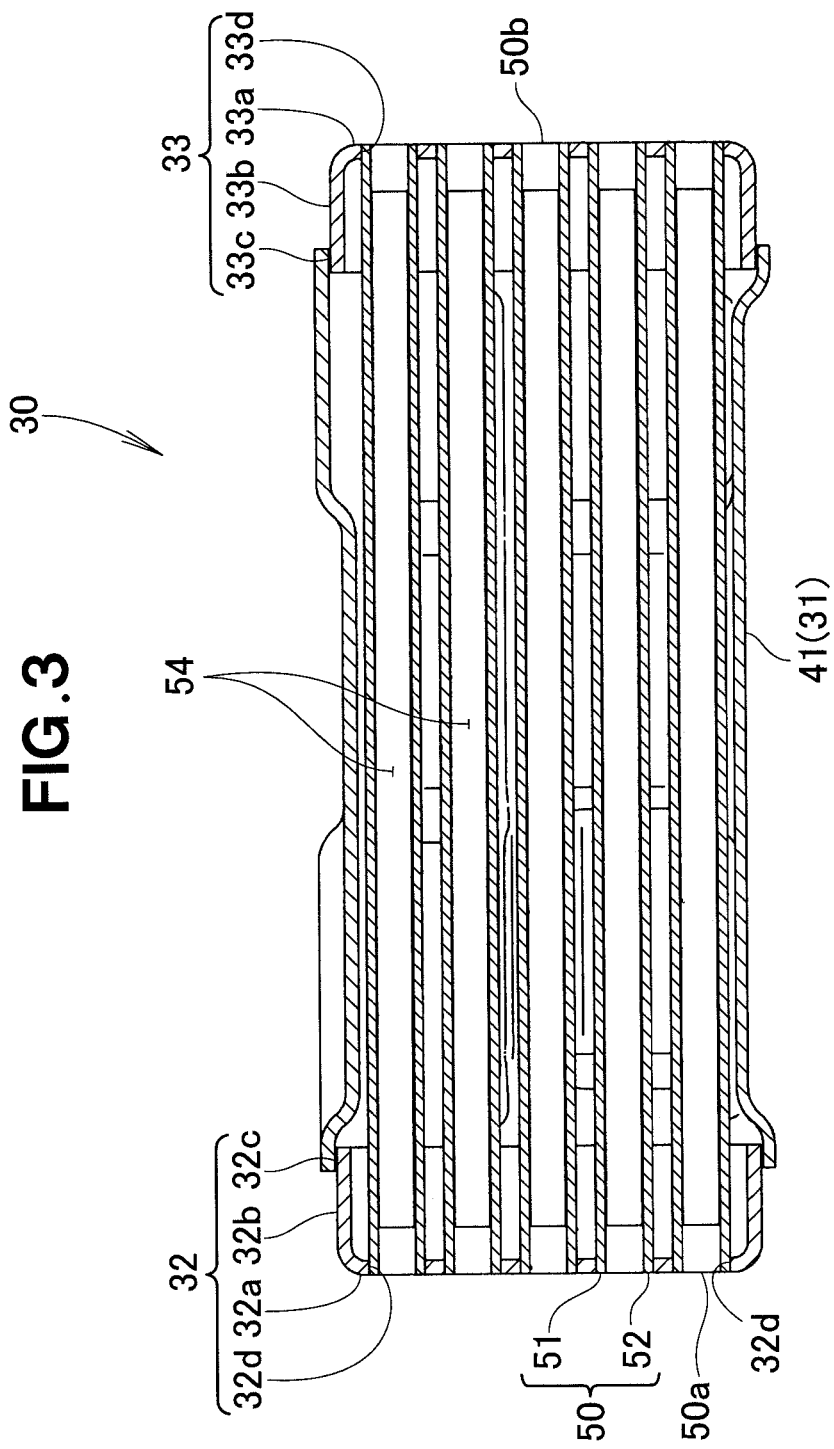
FIG. 3 is a sectional plan view of the heat exchanger of FIG. 1.

Further, as shown in FIG. 3, the upstream end plate 32 includes an upstream bottom surface section 32a that supports respective upstream bottom end portions of the heat exchange tubes 50, and an upstream side wall section 32b formed integrally with the outer periphery of the upstream bottom surface section 32a and extending downstream from the outer peripheral edge of the upstream bottom surface section 32a. A distal end portion 32c of the upstream side wall section 32b is located most downstream in the upstream end plate 32. The upstream bottom surface section 32a has a plurality of (five in the illustrated example) support holes 32d formed therein in corresponding relation to the heat exchange tubes 50 for supporting the corresponding heat exchange tubes 50 by permitting passage therethrough of the corresponding heat exchange tubes 50. The upstream side wall 32b is joined at only the distal end portion 32c to the core case 31.

The downstream end plate 33 too is constructed similarly to the upstream end plate 32. The downstream end plate 33 includes a downstream bottom surface section 33a that supports respective downstream bottom end portions of the heat exchange tubes 50, and a downstream side wall section 33b formed integrally with and extending upstream from the outer peripheral edge of the downstream bottom surface section 33a. A distal end portion 33c of the downstream side wall section 33b is located most upstream in the downstream end plate 33.

The downstream bottom surface section 33a too has a plurality of (five in the illustrated example) support holes 33d formed therein for supporting the corresponding heat exchange tubes 50 by permitting passage therethrough of the corresponding heat exchange tubes 50. The downstream side wall 33b is joined at only its distal end portion 33c to the core case 31.

The upstream side wall section 32b is joined at only its distal end portion 32c to the core case 31. Thus, the inner peripheral edge of the upstream side wall section 32b is not joined to the core case 31. Therefore, any members for introducing exhaust gas can be joined directly to the inner peripheral edge of the upstream side wall section 32b. Because the flow passages and the heat exchanger 30 can be joined directly to each other, there is no need to add separate component parts for interconnecting the flow passages and the heat exchanger 30. Therefore, it is possible to reduce the number of necessary component parts of the heat exchanger. The above description applies to the downstream end plate 33.

Figure 4:
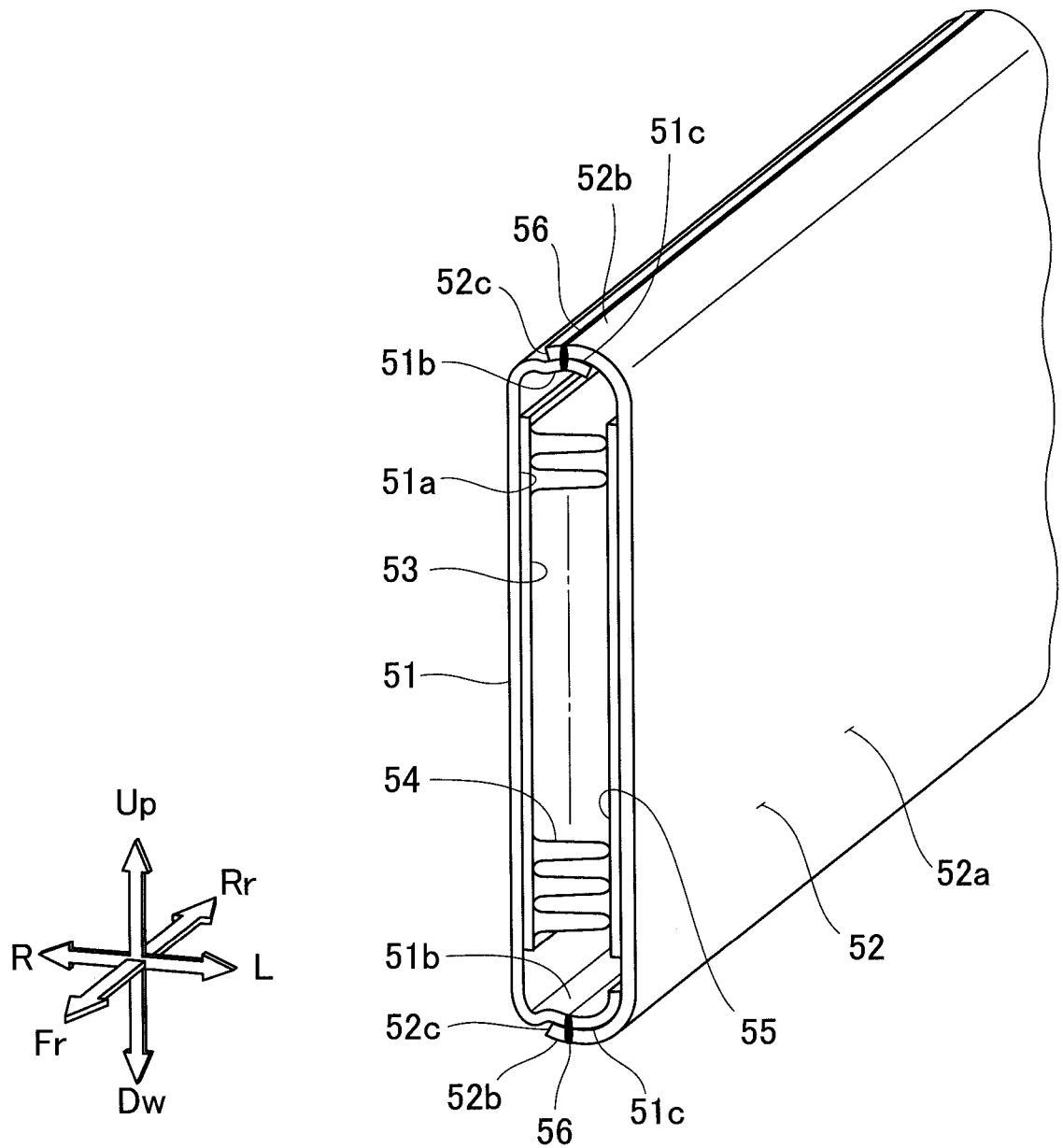
FIG. 4 is a perspective view of a heat exchange tube of FIG. 2.

The heat exchange tubes 50 will be described in detail with reference to FIG. 4. As shown in FIG. 4, each of the heat exchange tubes 50 has a generally elliptical shape, as viewed in front elevation, by a first case half 51 having a generally U shape as viewed in front elevation (i.e., generally U cross-sectional shape) and a second case half 52 having opposite side edge portions (upper and lower side edge portions in FIG. 4) superimposed and joined with opposite side edge portions (upper and lower side edge portions in FIG. 4) of the first case half 51. Namely, the heat exchange tube has a generally elliptical cross-sectional shape over an upstream-to-downstream length along the flowing direction (front-to-rear direction) of the first heat medium (exhaust gas). The first case half 51 includes a bottom section (hereinafter referred to also as "first bottom section") 51a extending in an up-down direction in FIG. 4, and wall sections (hereinafter referred to also as "first wall sections") 51b extending generally horizontally inward from the opposite edges of the first bottom section 51a. A brazing filler metal or material 53 is disposed on the first bottom section 51a of the first case half 51, and the fin 54 is brazed to the first case half 51 via the first brazing filler material 53.

The second case half 52 is constructed similarly to the first case half 51. Namely, the second case half 52, having a generally U shape as viewed in plan (i.e., generally U cross-sectional shape), includes a bottom section (hereinafter referred to also as "second bottom section") 52a extending in the up-down direction, and wall sections (hereinafter "second wall sections") 52b extending generally horizontally inward from the opposite side edges of the first bottom section 52a. A second brazing filler metal or material 55 is disposed on the bottom section 52a of the second case half 52, and the fin 54 is brazed to the second case half 52 via the second brazing filler material 55. Namely, the corrugated fin 54 is fixed by being brazed at its upper end lower end portions to the first and second case halves 51 and 52 by means of the first and second brazing filler materials 53 and 55. The first and second brazing filler materials 53 and 55 are each, for example, in the form of an amorphous sheet.

Side edge portions of the second wall section 52b are superimposed on corresponding side edge portions of the first wall section 51b. Namely, a sum of respective widths of the first case half 51 and second case half 52 is greater than a perimeter of the assembled heat exchange tube 50. The second wall section 52b is located inward of the first wall section 51b. The second case half 52 is welded to the first case half 51 by laser welding, i.e. laser-welded to the first case half 51.

More specifically, the second case half 52 is joined to the first case half 51 by a first weld bead 56, disposed (extending) through the thickness of the second wall section 52b, being fused to the first wall section 51b. The first weld bead 56 is formed near each of opposite lengthwise ends (upper and lower ends in FIG. 4) of the generally elliptical shape of the heat exchange tube 50, and the first weld bead 56 thus disposed through the thickness of the second wall section 52b extends continuously in the front-rear direction of the heat exchange tube 50.

Each of the heat exchange tubes 50 may be formed of a single plate material rather than the two plate materials. Namely, each of the heat exchange tubes 50 may be formed by: bending a single plate material greater in width or length than the perimeter of the heat exchange tube in such a manner that opposite side edge portions of the bent plate material are superimposed on each other in at least one section of the plate material, one of the superimposed side edge portions of the plate material, located inward of the other of the superimposed side edge portions of the plate material, forming an inner plate portion 51b, the other of the superimposed side edge portions of the plate material forming an outer plate portion 52b; and then causing the first weld bead 56, disposed through the thickness of one of the inner and outer plate portions, to be fused to the other of the inner and outer plate portions Whereas the heat exchange tube 50 has been described as having a generally elliptical shape as viewed in front elevation (generally elliptical cross-sectional shape), it may have a generally rectangular shape or any other desired shape as viewed in front elevation. In the case where the heat exchange tube 50 has a generally elliptical shape as noted above, the following advantageous benefits can be achieved. Namely, if the heat exchange tube 50 has a generally rectangular shape, for example, the first heat medium can undesirably flow to the opposite end portions of the tube 50 where the fin 54 is not disposed. However, if the heat exchange tube 50 has a generally elliptical shape (generally elliptical cross-sectional shape), it is possible to make it difficult for the first heat medium to flow to the opposite end portions of the tube 50, thereby enhancing the heat exchange efficiency. Further, the heat exchange tube 50 having a generally elliptical shape as above can not only facilitate welding, but also prevent stress concentration and enhance mountability of the heat exchange tube to the end plates 32 and 33 (see FIG. 2).

In the case where the heat exchange tube 50 is formed of a single plate material, the opposite side edge portions of the single plate material are superimposed on each other. As another alternative, the heat exchange tube 50 may be formed of three or more plate materials. In addition, the brazing filler material for brazing the fin 54 may be any other sheet-shaped brazing filler material than an amorphous sheet. Further, the brazing filler material for brazing the fin 54 may be of other than a sheet shape.

However, it is desirable that the brazing filler material be of a sheet shape, because, in such a case, a necessary operating time for positioning the brazing filler material can be reduced as compared to a case where a brazing filler material in paste form is to be positioned. Thus, it is possible to reduce a total necessary time for manufacturing the heat exchange tube 50 and hence the heat exchanger 30 (see FIG. 2).

Further, in the case where the sheet-shaped brazing filler material is used, a uniform thickness of the brazing filler material can be achieved, and thus, it is possible to minimize variation in gaps that could be produced between the brazing filler material and the fin 54.

Further, the superimposed portions of the first case half 51 and the second case half 52 of the heat exchange tube 50 are joined together by a joggle joint. Thus, the plurality of heat exchange tubes 50 can be clamped to one another through load control, and each of the fins 54 and the corresponding heat exchange tube 50 can be appropriately welded in close contact with each other.

Furthermore, in the instant embodiment, the brazing filler material is less likely to be peeled off after positioning, so that the fin 54 can be joined to the heat exchange tube 50 in a stable manner. Moreover, after the joining of the heat exchange tube 50, a leakage check can be performed to check for any leakage of the exhaust gas through the joint section.

Figure 5:
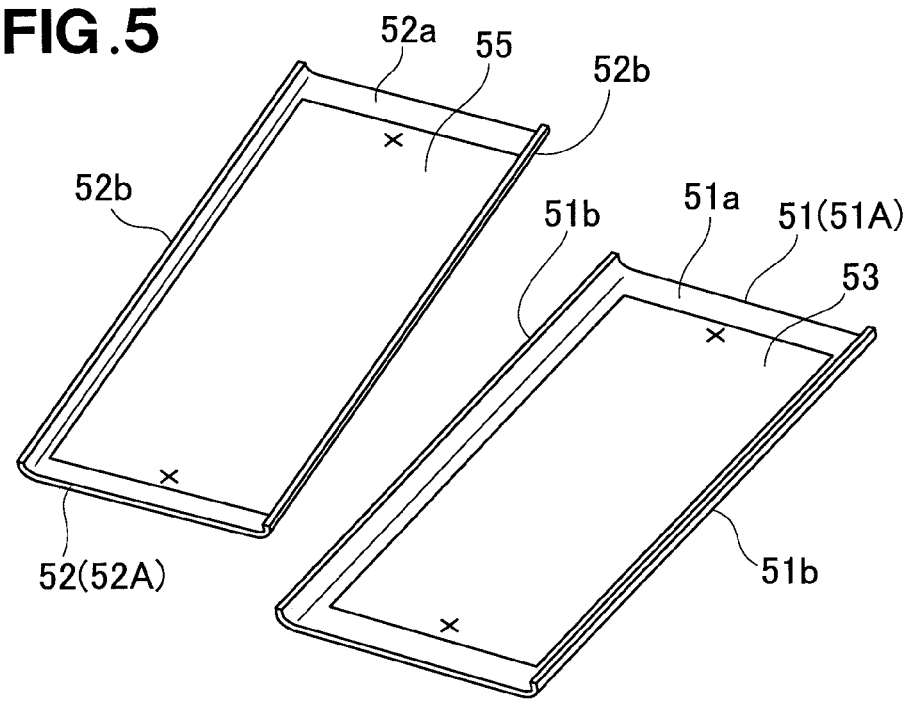
FIG. 5 is a view explanatory of a preparation step to a brazing-filler-material attaching step in a method for manufacturing the heat exchanger shown in FIG. 1.

Now, with reference to FIGS. 5 to 11, a description will be given about a method for manufacturing the heat exchanger 30 (heat exchanger manufacturing method). First, the first and second case halves 51 and 52, each formed in a predetermined shape by press forming, and the first and second brazing filler materials 53 and 55 are prepared as shown in FIG. 5.

Then, the first brazing filler material 53 of a rectangular sheet shape is positioned on the bottom section 51a of the first case half 51, and the second brazing filler material 55 of a rectangular sheet shape is positioned on the bottom section 52a of the second case half 52.

After that, two opposite end portions, i.e. upstream and downstream end portions as viewed in the flowing direction of the first heat medium, of a widthwise middle region of the first brazing filler material 53 are welded to the first case half 51 to thereby provide a first brazing-filler-material-attached case half 51A. Similarly, two opposite end portions, i.e. upstream and downstream end portions as viewed in the flowing direction of the first heat medium, of a widthwise middle region of the second brazing filler material 55 are welded to the second case half 52 to thereby provide a second brazing-filler-material-attached case half 52A. In this manner, the first and second brazing filler materials 53 and 55 are attached to the first and second case halves 51 and 52, respectively. Note, however, that any other portions than the above-mentioned end portions and any other number of such portions of the first and second brazing filler materials 53 and 55 may be attached to the first and second case halves 51 and 52 using any other desired scheme than the aforementioned.

Note that, in the brazing-filler-material attaching step, the first and second brazing filler materials 53 and 55 may be fixed to the first and second case halves 51 and 52 by spot welding performed in a direction from the brazing filler materials 53 and 55 toward the first and second case halves 51 and 52. Any other desired scheme than the aforementioned may be employed in the brazing-filler-material attaching step.

Figure 6:
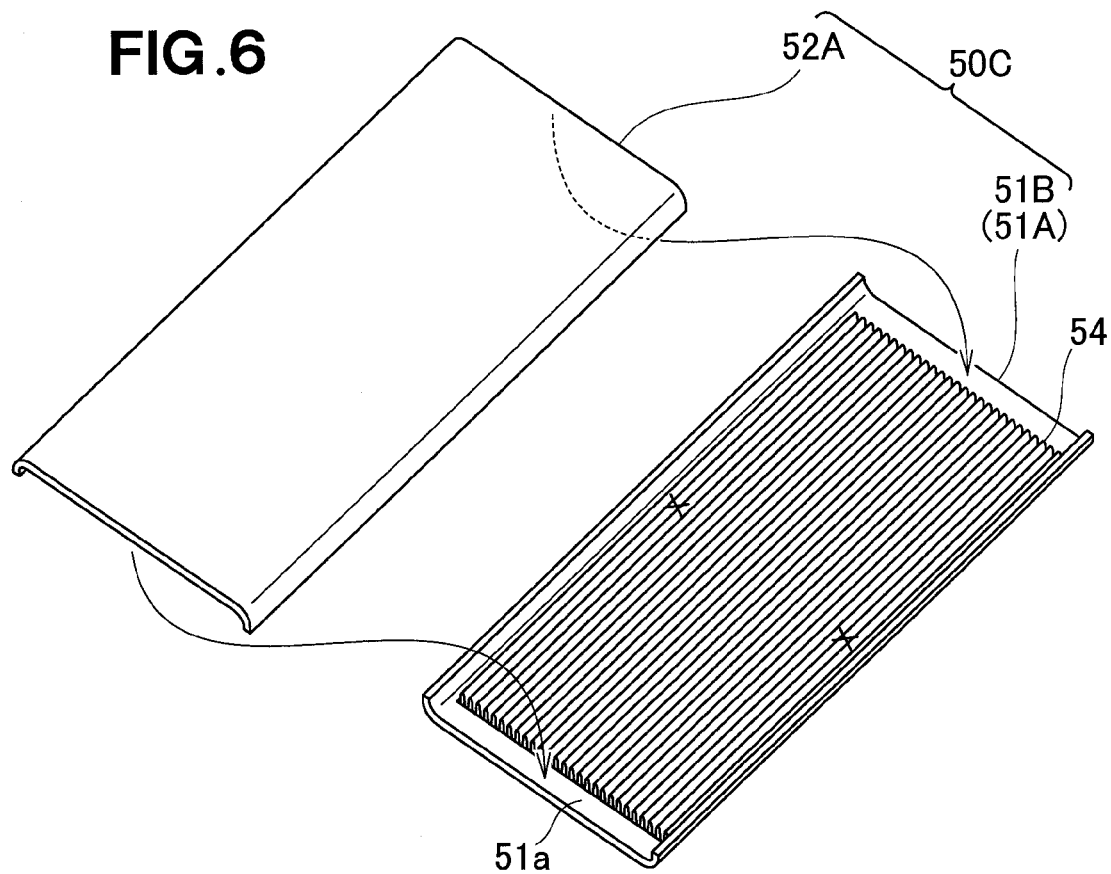
FIG. 6 is a view explanatory of a temporary fin tacking step to a superimposing step in the method for manufacturing the heat exchanger shown in FIG. 1.

Then, the fin 54 is placed on the first brazing filler material 53 (FIG. 5) of the first brazing-filler-material-attached case half 51A, as shown in FIG. 6. After that, two widthwise opposite end portions of a lengthwise middle region of the placed fin 54 are welded by spot welding to the first brazing-filler-material-attached case half 51A. By such a temporary fin tacking step, a first brazing-filler-material-attached and fin-tacked case half 51B is provided. Note, however, that any other portions than the aforementioned end portions and any other number of such portions of the fin 54 may be fixed to the first brazing-filler-material-attached case half 51A using any other desired scheme than the aforementioned.

Then, a flat temporarily-assembled tube 50C is provided by superimposing the second brazing-filler-material-attached case half 51A on the first brazing-filler-material-attached and fin-fixed case half 51B. By superimposing the second brazing-filler-material-attached case half 51A on the first brazing-filler-material-attached and fin-fixed case half 51B, the second brazing filler material 55 (FIG. 5) contacts the fin 54. Namely, in this superimposing step, the fin 54 is sandwiched between the first and second brazing filler materials. Note that, in the temporary fin tacking step, the second brazing-filler-material-and-fin-fixed case half may be provided by temporarily tacking the fin 54 to the second brazing-filler-material-attached case half 52A.

Then, laser welding is performed by a laser welding device 61 on superimposed portions of the temporarily-assembled tube 50C from outside the superimposed portions, as shown in FIG. 7. The first weld bead 56 is formed by such laser welding on the superimposed portions, and the first weld bead 56 is disposed through the thickness of the second wall section 52b to reach the first wall section 51b. Then, the heat exchange tube 50 is provided by a tube welding step.

Namely, the heat exchange tube 50 is provided by causing the first weld bead 56 to extend through the thickness of one (e.g., second wall section 52b) of the inner plate portion (first wall section 51b) and the outer plate portion (second wall section 52b) in the superimposed portions of the first case half 51 and the second case half 52 and then welding the fused portion to the other (e.g., first wall section 51b) of the inner plate portion (first wall section 51b) and the outer plate portion (second wall section 52b).

Then, as shown in FIG. 8A, one end portion of each of the heat exchange tube 50 is inserted into one of a plurality of support holes 32d formed in the upstream end plate 32, and the other end portion of each of the heat exchange tube 50 is inserted into one of a plurality of support holes 33d formed in the downstream end plate 33. By such an inserting step, a tube-inserted unit 70A is provided.

FIG. 8B is a fragmentary enlarged view of a section encircled at 8B in FIG. 8A. As shown in FIG. 8B, a gap S of a generally triangular shape is defined by the outer surface 51c of the first case half 51, an end surface 52c of the side edge portion of the second case half 52 and a portion of the upstream end plate 32 defining the support hole 32d. This gap S is formed inevitably due to the plate thickness of the second case half 52 disposed outside the first case half 51. Namely, even where the first case half 51 disposed inward of the second case half 52 is bent toward the second case half 52, such a gap S of a small side would be formed. The downstream end plate 33 (FIG. 3) is constructed in a similar manner to the upstream end plate 32. It can also be said that the gap S is defined by the outer surface 51c of the inner plate portion, the end surface 52c of the outer plate portion and the end plate 32.

Next, a description will be given about an example manner in which the upstream and downstream end plates 32 and 33 are made. Because the downstream end plate 33 is made in a similar manner (i.e., by similar steps) to the upstream end plate 32, the following representatively describe the upstream end plate 32 while omitting a description about the downstream end plate 33. In the following description, the upstream end plate 32 will be referred to simply as "the end plate 32" as appropriate.

Figure 9A:
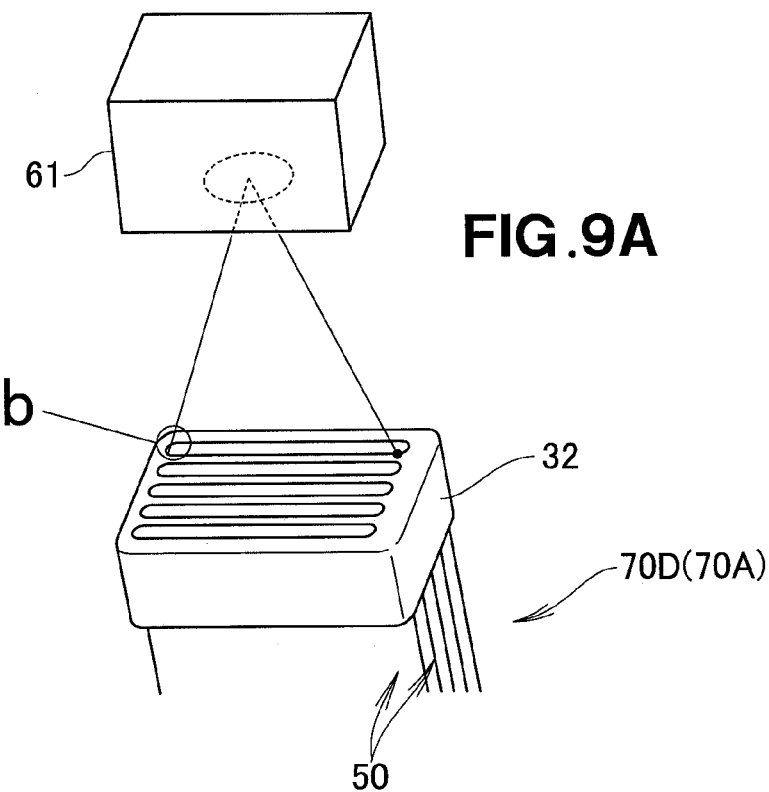
FIGS. 9A and 9B are views explanatory of a temporary tacking step in the method for manufacturing the heat exchanger shown in FIG. 1.
Figure 9B:
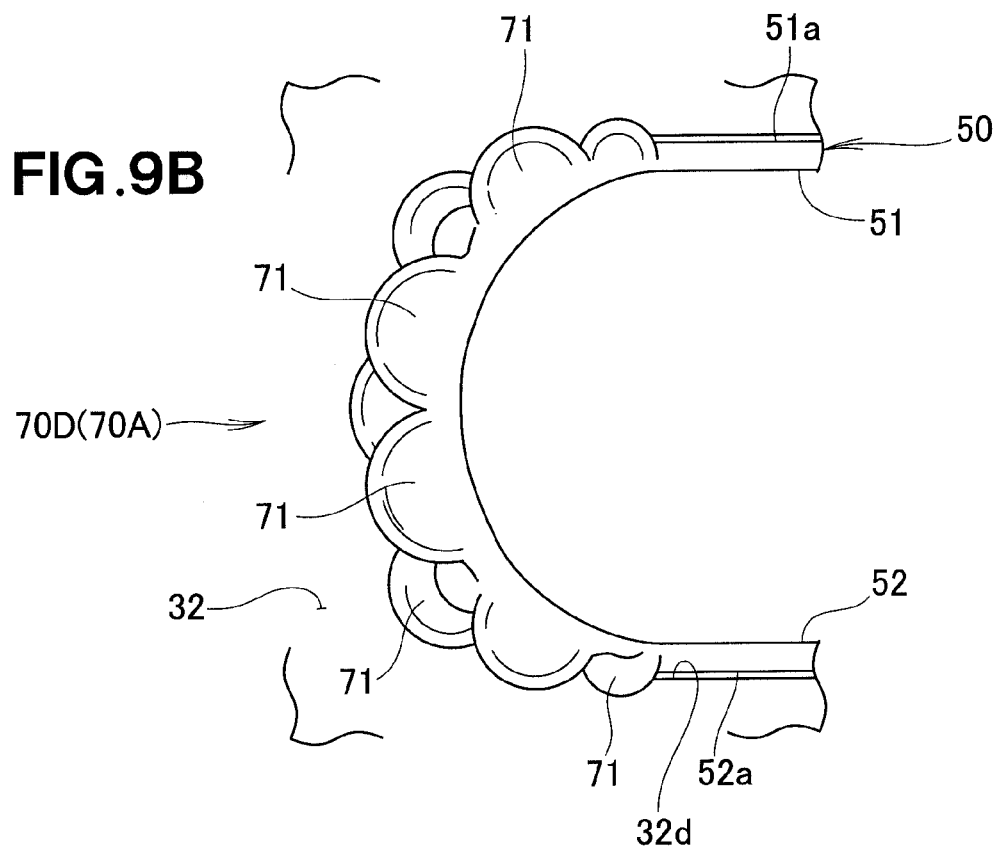

FIG. 9A is a view explanatory of a temporary tacking step performed in the heat exchanger manufacturing method of the present invention, and FIG. 9B is a fragmentary enlarged view of FIG. 9A. Each of the heat exchange tubes 50 is laser-welded to the end plate 32, by which the heat exchange tube 50 is temporarily tacked to the end plate 32 via a plurality of dot-shaped second weld beads 71. The laser welding is performed at least on a curved portion of the heat exchange tube 50 of the elliptical shape. The aforementioned gap S (see FIG. 8B) can be filled with the dot-shaped second weld beads 71 formed during the temporary tacking step. In this way, the heat exchange tube 50 can be reliably fixed to the end plate 32.

The gap S inevitably formed due to the plate thickness can be filled with the second weld beads 71 simultaneously as the welding for fixing the heat exchange tube 50 to the end plate 32 is carried out. Thus, there is no need for a separate operation for filling the gap S, and thus, the heat exchanger can be advantageously manufactured with a reduced number of steps.

Figure 10:
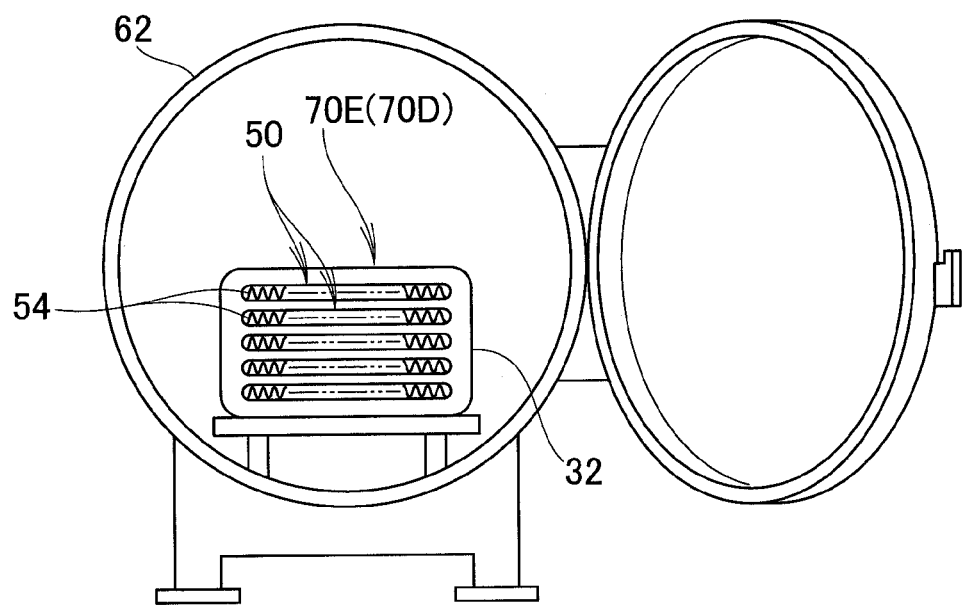
FIG. 10 is a view explanatory of a brazing step in the method for manufacturing the heat exchanger shown in FIG. 1.

Then, a temporarily-assembled end plate/tube unit 70D provided by the temporary tacking step is placed in a vacuum kiln 62, and the fin 54 is brazed to the heat exchange tube 50 in the kiln 62 as shown in FIG. 10. A brazed temporarily-assembled end plate/tube unit 70E is provided by such a brazing step.

Because the temporarily-tacked heat exchange tube 50 is brazed in the instant embodiment, there is no need to prepare, among other things, a jig for fixing the heat exchanger 50 at the time of the brazing. Namely, in this case, the end plate 32 functions also as a jig, so that the instant embodiment can reduce the number of component parts necessary for manufacturing the heat exchanger and hence the manufacturing cost of the heat exchanger.

After the brazing step, the peripheral edge of the heat exchange tube 50 is continuously laser-welded to the end plate 32. By such a welding step, a continuous bead 72 is formed on the peripheral edge of the heat exchange tube 50, so that an end plate/tube assembly 70F can be provided. In this welding step, the laser output is set higher than in the tube welding step and temporary tacking step, so that high-energy welding is performed.

Welding the heat exchange tube 50 to the end plate 32 like this can achieve stable airtightness and high strength as compared to the mere brazing of the heat exchange tube 50 to the end plate 32.

Figure 11:
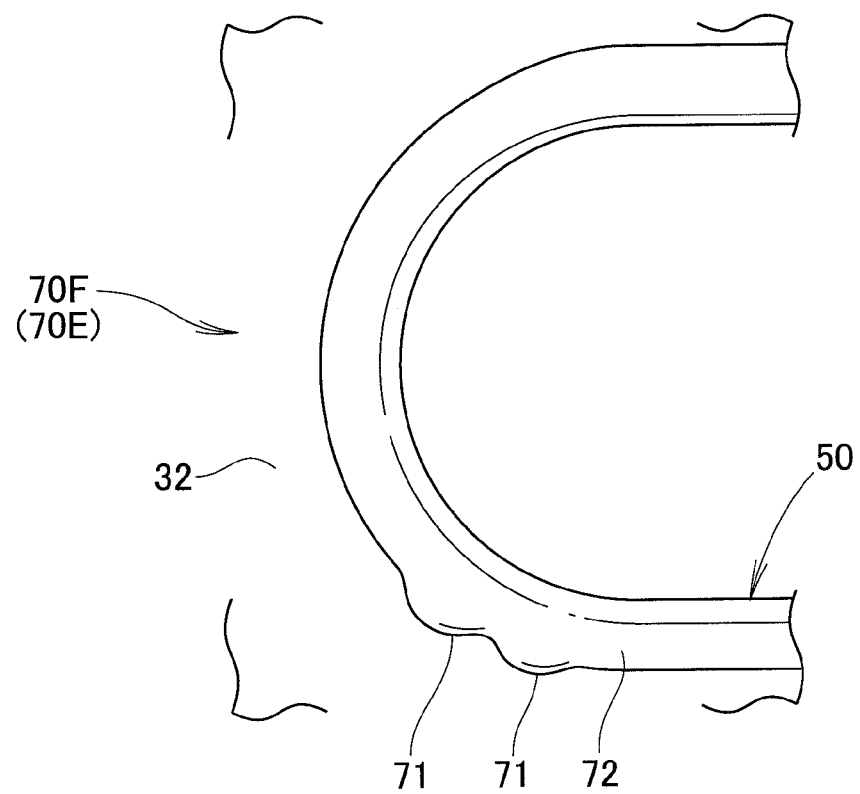
FIG. 11 is a view explanatory of a final welding step in the method for manufacturing the heat exchanger shown in FIG. 1.

The second weld bead 71 is covered by the continuous bead 72, as seen from FIGS. 8B, 9B and 11. Namely, the heat exchange tube 50 is temporarily tacked to the end plate 32 in advance before the peripheral edge of the heat exchange tube 50 is welded to the end plate 32. At that time, particularly for the superimposed portions of the two wall sections 51b and 52b which could easily peel off ere peel-off, at least one of end portions of the wall sections 51b and 51b and a region where the two wall sections 51b and 52b is superimposed on each other are temporarily tacked. In this way, it is possible to prevent the heat exchange tube 50 from peeling off the end plate 32 due to influences of heat during continuous welding, to the end plate 32, of the peripheral edge of the heat exchange tube 50. Namely, the peripheral edge of the heat exchange tube 50 can be welded to the end plate 32 with no gap therebetween with an increased reliability.

In addition, in the instant embodiment, the continuous bead 72 is a weld bead formed by welding higher in energy than the welding performed for forming the first and second weld beads 56 and 71. If high-energy welding is employed in the steps where the first and second weld beads 56 and 71 are formed (i.e., the tube welding step and the temporary tacking step), slight distortion might occur in the heat exchange tube 50 so that subsequent steps would become difficult to perform. Particularly, when the fin 54 (see FIG. 4) is to be brazed within the heat exchange tube 50 by means of the brazing filler materials 53 and 55 (see FIG. 4), brazing performance may undesirably degrade due to deformation of the heat exchange tube 50. The step where the continuous bead 72 is formed (final welding step), on the other hand, is performed after the steps where the first and second weld beads 56 and 71 are formed (i.e., the tube welding step and the temporary tacking step). Thus, in order to join the end plate 32 and the heat exchange tube 50 together with an increased reliability, the instant embodiment is arranged to form the continuous bead 72 by welding higher in energy than the welding performed for the first and second weld beads 56 and 71. Therefore, it can be said that the instant embodiment can reliably prevent occurrence of unwanted gaps while securing good assemblability of the heat exchanger.

Figure 12A:
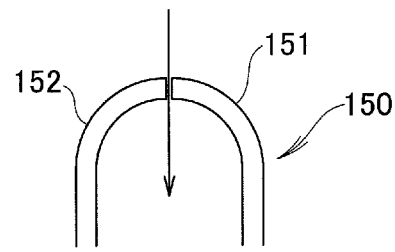
FIGS. 12A to 12F are views comparatively showing a heat exchange tube employed in comparative conventional example of a heat exchanger and the heat exchange tube employed in the first embodiment of the heat exchanger of the present invention.

FIG. 12A shows a heat exchange tube 150 used in comparative conventional example 1 of a heat exchanger, which comprises two case halves 151 and 152 butted end to end against each other. In this case, it may be conceivable to join the case halves 151 and 152 with each other by welding the butted portions of the case halves 151 and 152. However, a bead formed in this case tends to have an unstable bead shape, e.g. inevitably protruding beyond the outer surface of the case halves 151 and 152. In this case, there is a need to strictly manage the butted portions of the case halves 151 and 152 in order to prevent occurrence of gaps.

In order to prevent or suppress occurrence of protrusion of the bead, it may be conceivable to laser-weld the butted portions of the case halves 151 and 152. If any gap exists as shown in FIG. 12A, laser would leak through the gap into the case halves 151 and 152. Such laser leaking into the case halves 151 and 152 would be irradiated onto the fin etc., so that the fin etc. may be undesirably damaged.

Figure 12B:
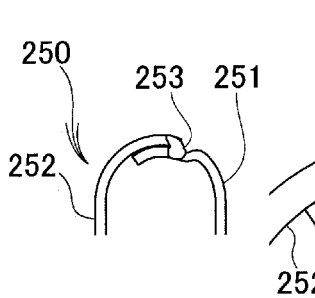
Figure 12C:
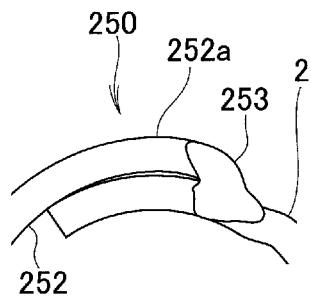
Figure 12D:
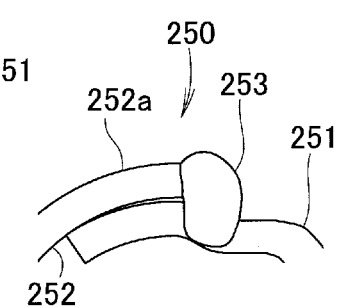

FIGS. 12B to 12D shows a heat exchange tube 250 used in comparative conventional example 2 of a heat exchanger, which comprises two case halves 251 and 252 butted end to end against each other. The end surface of the outer case half 252 and the outer surface of the inner case half 251 are welded together.

In this case, it may be conceivable to join the case halves 251 and 252 with each other by welding the case halves 151 and 152. However, a bead 253 formed in this case tends to have an unstable bead shape, e.g. protruding beyond the outer surface 252a of the case halve 252, as shown in FIG. 12D. If the bead 253 protrudes from the outer surface 252a of the case halve 252 like this, it becomes difficult to insert the case halves 151 and 152 into the end plates 32 and 33 (FIG. 3). Further, if the protruding portion of the bead 253 is shaved off with a view to facilitating the insertion of the case halves 151 and 152, then the necessary operating time would increase due to the added shaving operation.

Further, in order to prevent or suppress occurrence of protrusion of the bead, it may be conceivable to laser-weld the case halves 251 and 252. If laser is irradiated onto the end surface of the outer case half 252, the shape of the bead 253 would become unstable depending on how the end surface of the outer case half 252 melts. Therefore, variation in joint strength tends to occur among the tubes 250.

Figure 12E:
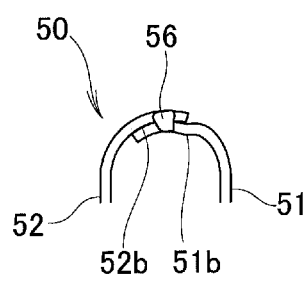
Figure 12F:
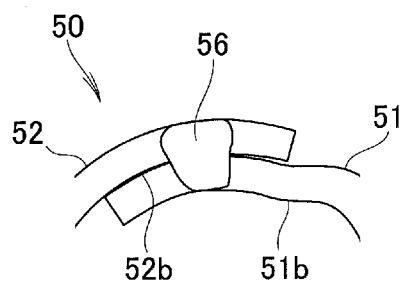

FIGS. 12E and 12F show the heat exchange tube 50 provided in the embodiment of the heat exchanger of the present invention. In the heat exchange tube 50, the mutually-superimposed first and second wall sections 51b and 52b are joined together by the first bead 56, disposed through the second wall section 52b, fused to the first wall section 51b. Namely, the first weld bead 56 is formed on the superimposed portions of the first and second wall sections 51b and 52b. Thus, it is possible to prevent the first weld bead 56 from protruding beyond the outer surface of the second wall section 52b. As a consequence, there is no need to shave off the first weld bead 56 so as not to protrude beyond (i.e., so as to lie generally in flush with) the outer surface of the second wall section 52b, so that the heat exchange tube 50 can be manufactured with a reduced number of steps. Therefore, the instant embodiment can advantageously reduce the total number of necessary steps for manufacturing the heat exchanger 30. Further, because the shape of the first weld bead 56 can be stabilized, variation in joint strength among the heat exchange tubes 50 can be effectively prevented. Namely, the instant embodiment can stabilize the joint strength.

FIG. 13A shows a heat-exchanger manufacturing method according to comparative conventional example 3, in which a brazing step is performed after a temporary tacking step and a final welding step are performed. However, in the final welding, the heat exchange tube 50 might slightly deform due to heat. Thus, if the final welding is performed before the brazing, variation might undesirably occur in the joint strength of the fin 54 (see FIG. 4) due to the deformation having occurred in the final welding.

FIG. 13B shows the embodiment of the manufacturing method of the present invention, in which the final welding step is performed after the temporary tacking step and the brazing step. Because the brazing is performed prior to the final welding, the joint strength of the fin can be stabilized throughout the fin.

Figure 14:
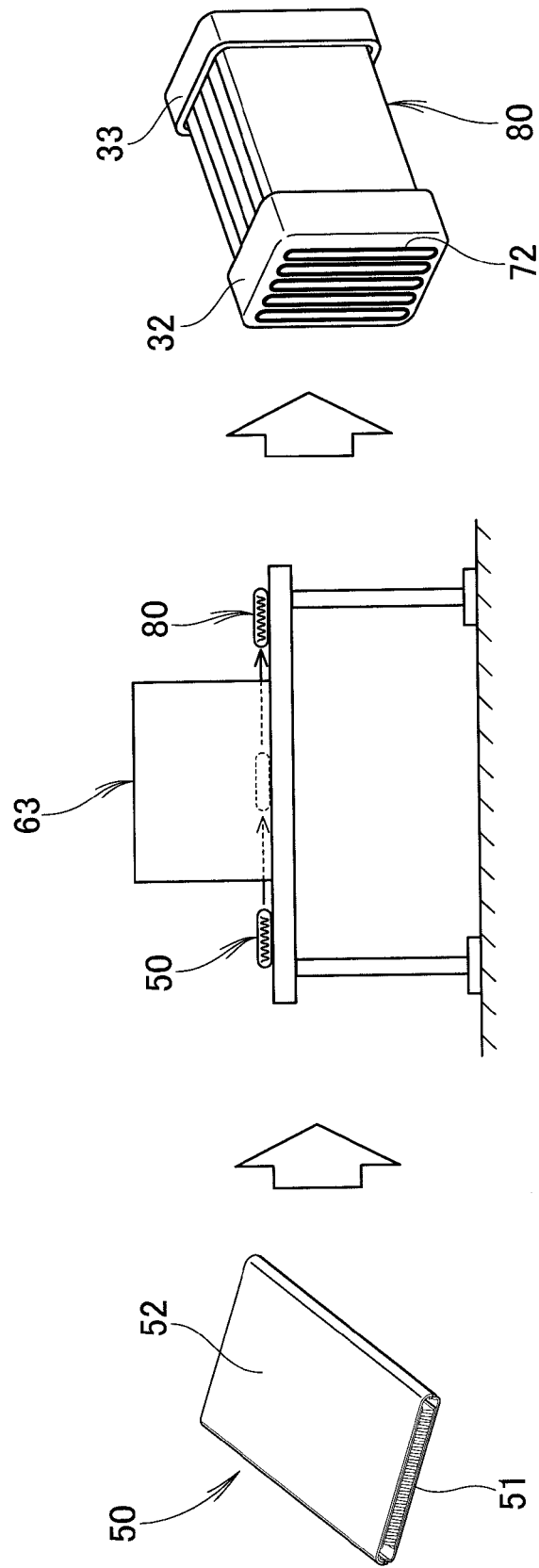
FIG. 14 is a view explanatory of a method for manufacturing a second embodiment of the heat exchanger of the present invention.
Figure 17A:
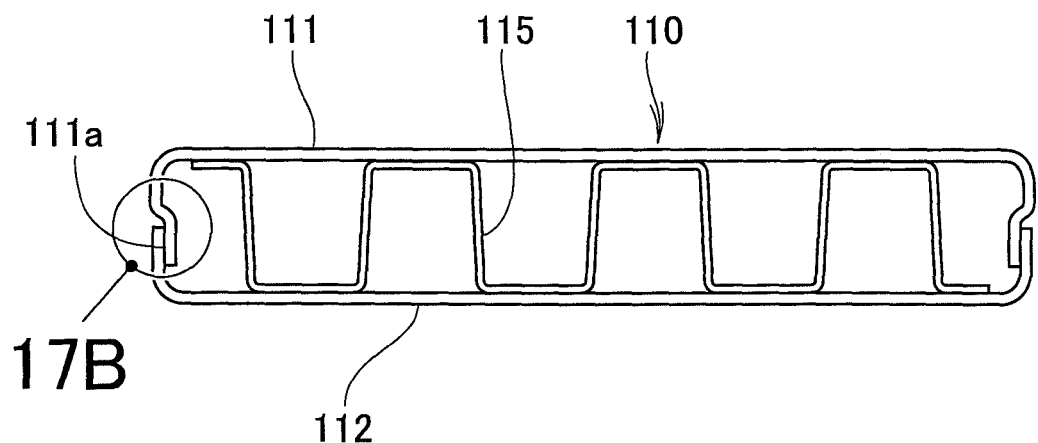
FIGS. 17A and 17B are views explanatory of a conventionally-known heat exchanger.
Figure 17B:
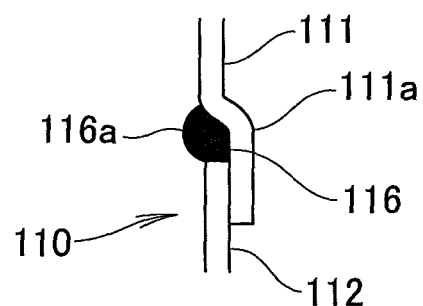

FIG. 14 shows a method for manufacturing a second embodiment of the heat exchanger of the present invention. The following describe only differences of the second embodiment from the first embodiment, omitting description about the same points as the first embodiment to avoid unnecessary duplication. The same elements as in the first embodiment are depicted by the same reference numerals as in the first embodiment and will not be described in detail here.

According to the manufacturing method, the brazing is performed using a continuous kiln 63. The heat exchange tube 80 having been subjected to such a brazing step (continuous-kiln brazing step) is inserted at opposite end portions into the upstream and downstream end plates 32 and 33. After that, the peripheral edge of the heat exchange tube 80 is continuously welded to the end plates 32 and 33. Such a second embodiment can achieve the same predetermined advantageous benefits as the first embodiment. Further, because the brazing is performed using the continuous kiln 63, the instant embodiment can perform the brazing more promptly than in the case where the brazing is performed using a batch-type kiln like the vacuum kiln 62 (see FIG. 10).

FIGS. 15A and 15B are sectional views showing a third embodiment of the heat exchanger of the present invention. The following describe only differences of the third embodiment from the first embodiment, omitting description about the same points as in the first embodiment to avoid unnecessary duplication. The same elements as in the first embodiment are depicted by the same reference numerals as in the first embodiment and will not be described in detail here.

An end plate 92 has a plurality of support holes 92d that are first preformed in a wave-like sectional shape and then machined as holes. Thus, a projecting portion is formed around the peripheral edge of each of the support holes 92d so as to gradually decrease in plate thickness toward the distal end thereof located adjacent to the outer end of the end plate 92. Further, of each of the support holes 92d, an end portion closer to the core case 31 (see FIG. 3) has a peripheral edge 92e of an arcuate sectional shape.

The third embodiment where the end plate 92 is used can achieve the same predetermined advantageous benefits as the first embodiment. Further, because the distal end of the support hole 92d has a small thickness, an overall thickness of a joint section between the support hole 92d and the heat exchange tube 50 can be reduced. Thus, it is possible to reduce energy necessary for welding the heat exchange tube 50 to the end plate 92. Further, because of the reduced overall thickness of the joint section, the welding can be performed stably with a high efficiency. Furthermore, because the peripheral edge 92e of the end portion closer to the core case 31 has an arcuate sectional shape, the peripheral edge 92e can function as a guide for the heat exchange tube 50 when the heat exchange tube 50 is to be inserted into the end plate 92. Furthermore, the heat exchange tube 50 can be press-fit into the end plate 92, which can significantly enhance the assemblability of the heat exchanger.

Note that the aforementioned end plate 92 can be used as either or both of the upstream and downstream end plates. Furthermore, the support holes 92d of the end plate 92 may be formed in any desired manner.

FIGS. 16A and 16B are sectional views showing a fourth embodiment of the heat exchanger of the present invention. The following describe only differences of the fourth embodiment from the first embodiment, omitting description about the same points as in the first embodiment to avoid unnecessary duplication. The same elements as in the first embodiment are depicted by the same reference numerals as in the first embodiment and will not be described in detail here.

An end plate 102 has a plurality of support holes 102d that are preformed in a wave-like sectional shape and then machined as holes. Thus, a projecting portion is formed around the peripheral edge of each of the support holes 102d so as to gradually decrease in plate thickness toward the distal end thereof. Further, of each of the support holes 102d, an end portion closer to the core case 31 (see FIG. 3) has a peripheral edge 102e having a flat central surface and a peripheral slant surface slanting from the peripheral edge of the flat central surface obliquely toward the distal end.

The fourth embodiment where such an end plate 102 is used can achieve the same predetermined advantageous benefits as the first embodiment. Because the distal (outer) end of the support hole 102d has a small thickness, an overall thickness of a joint section between the support hole 102d and the heat exchange tube 50 can be reduced. Thus, it is possible to reduce energy necessary for welding the heat exchange tube 50 to the end plate 102. Further, because of the reduced overall thickness of the joint section, the welding can be performed stably with a high efficiency. Further, because the peripheral edge 102e of the end portion closer to the core case 31 has a slanting peripheral surface extending obliquely toward the distal end, the peripheral edge 102e can function as a guide for the heat exchange tube 50 when the heat exchange tube 50 is to be inserted into the end plate 102. Furthermore, the heat exchange tube 50 can be press-fit into the end plate 102, which can significantly enhance the assemblability of the heat exchanger.

Note that the aforementioned end plate 102 can be used as either or both of the upstream and downstream end plates. Furthermore, the support holes 102d of the end plate 102 may be formed in any desired manner. The heat exchange tube 50 may be press-fit into the end plate, in which case the brazing step may be performed prior to the laser-used temporary welding step and the temporary welding step and the final welding step may be performed in succession. Further, because temporary welding step is performed prior to the brazing step, it is possible to dispense with steps of clamping and releasing a temporarily-assembled tube.

Whereas the embodiments of the heat exchanger of the present invention have been described above as applied to the exhaust heat recovery apparatus, the present invention is also applicable to EGR (Exhaust Gas Recirculation) coolers and cogeneration systems, thermoelectric generation apparatus, etc. The present invention is also applicable to apparatus, systems, etc. other than those performing heat exchange between heat of exhaust gas and a medium.

Further, the above-described embodiments of the heat exchanger of the present invention may be used in any desired combination. For example, the end plate employed in the third embodiment of the present invention may be used as any one of the end plates employed in the first embodiment. Namely, the present invention is not limited to the above-described embodiments and may be modified variously as long as it can achieve the aforementioned behavior and advantageous benefits.

The basic principles of the present invention are well suited for application to exhaust heat recovery apparatus.

What is claimed is:

1. A heat exchanger comprising:
a core case;
a pair of end plates closing opposite ends of the core case; and
a plurality of heat exchange tubes each supported at opposite end portions thereof by the end plates, a first heat medium being caused to flow through an interior of the heat exchange tubes so that heat exchange is performed between the first heat medium and a second heat medium caused to flow along an outer periphery of the heat exchange tubes, each of the heat exchange tubes being formed by bending a plate material greater in length than a perimeter of the heat exchange tube in such a manner that opposite edge portions of the bent plate material are superimposed on each other in at least one section of the plate material, one of the superimposed edge portions of the plate material, located inward of other of the superimposed edge portions of the plate material, forming an inner plate portion, the other of the superimposed edge portions of the plate material forming an outer plate portion; and then welding a weld beam through a thickness of one of the inner and outer plate portions to fuse to the other of the inner and outer plate portions, the end plates each having a plurality of support holes formed therein in corresponding relation to the plurality of heat exchange tubes so that the opposite end portions of each of the heat exchange tubes are inserted in corresponding ones of the support holes in the end plates, and each of the end plates having a projecting portion around a periphery edge of each of the support holes, the projecting portion gradually decreasing in plate thickness toward a distal end thereof located adjacent to an outer end of one of the end portions of the corresponding heat exchange tube.

2. The heat exchanger according to claim 1, wherein each of the heat exchange tubes has a generally elliptical cross-sectional shape over an upstream-to-downstream length thereof along a flowing direction of the first heat medium.

3. The heat exchanger according to claim 1, wherein a fin is accommodated in each of the heat exchange tubes, and the fin is brazed to the heat exchange tube by means of a sheet-shaped brazing filler material.

\* \* \* \* \*